Feb. 1, 1966    A. G. BODINE, JR    3,233,012
METHOD AND APPARATUS FOR FORMING PLASTIC MATERIALS
Filed April 23, 1963    2 Sheets-Sheet 1
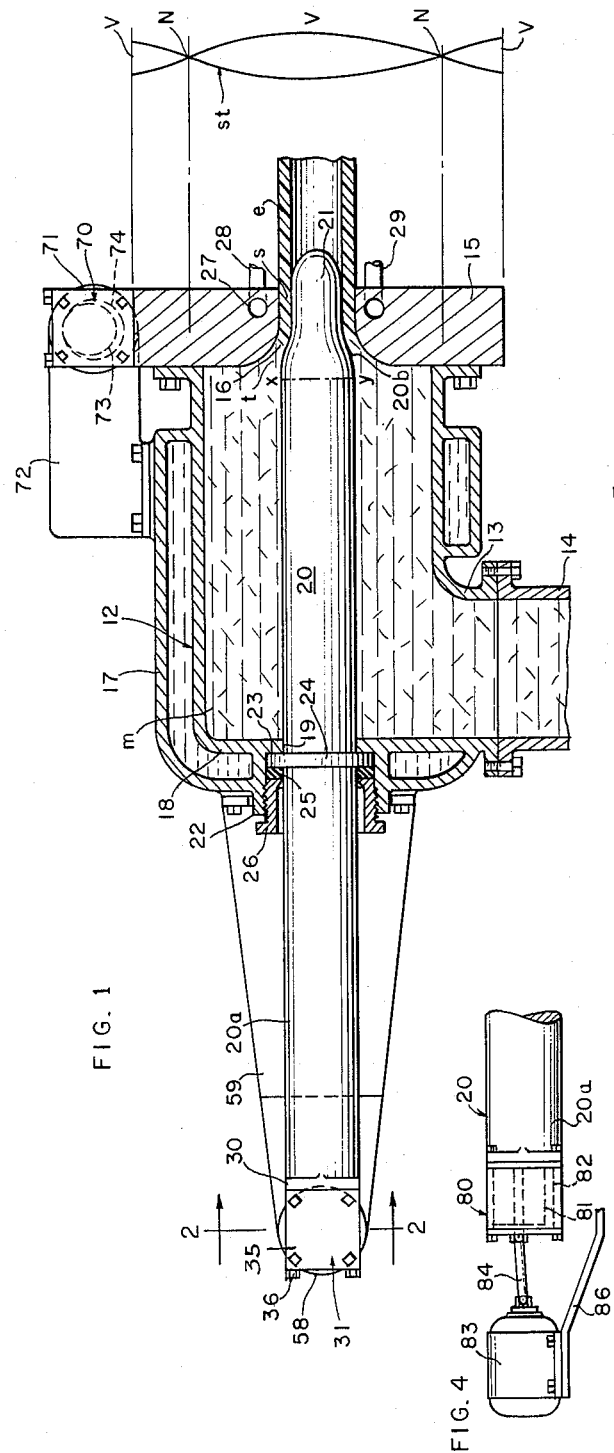
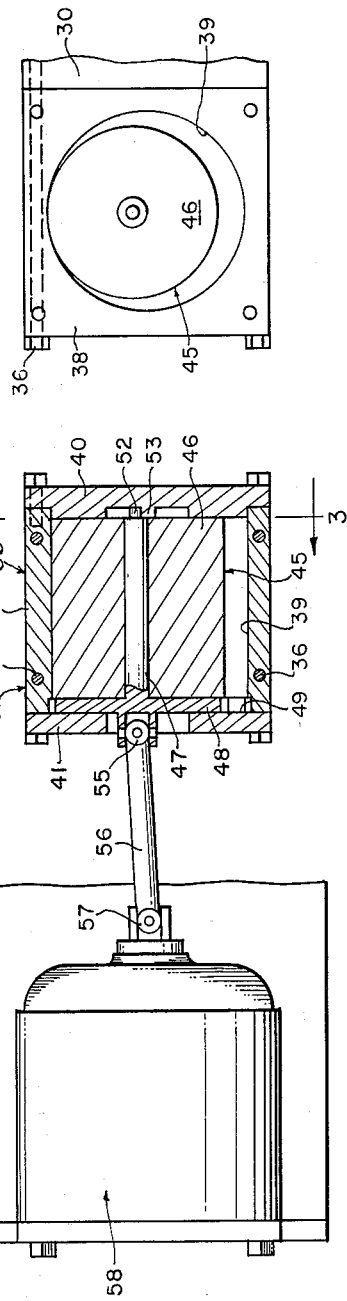
INVENTOR.
ALBERT G. BODINE JR.
BY
*Forrest J. Lilly*
ATTORNEY

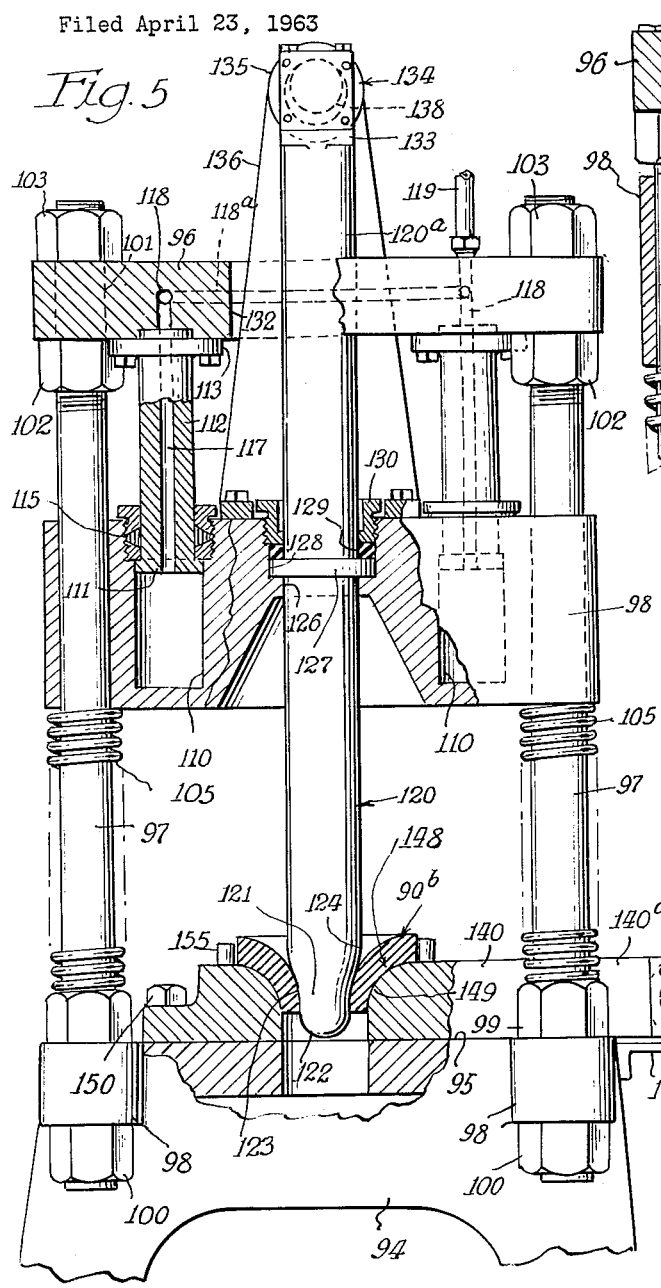
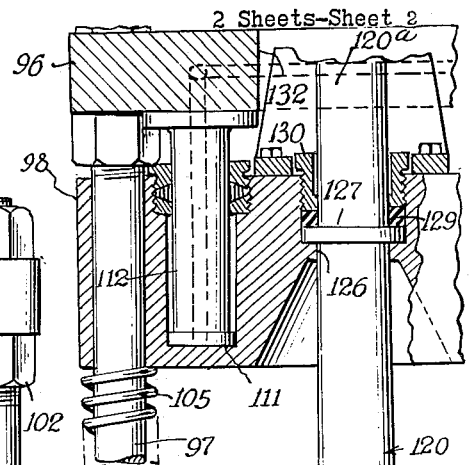
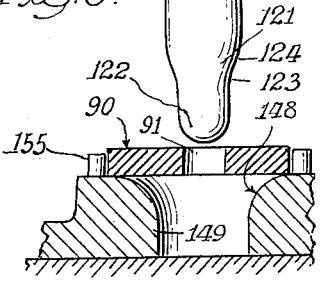
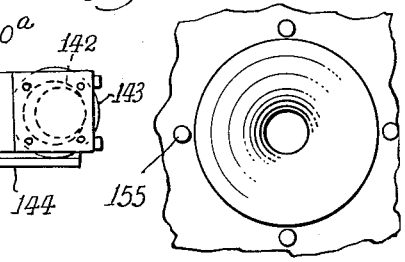
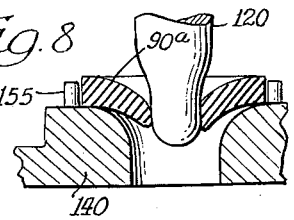
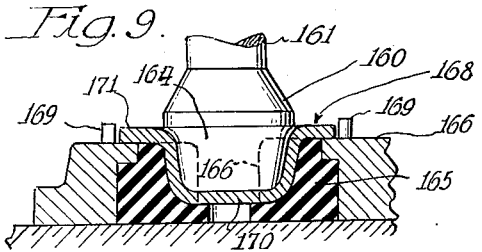

United States Patent Office 3,233,012
Patented Feb. 1, 1966

3,233,012
METHOD AND APPARATUS FOR FORMING
PLASTIC MATERIALS
Albert G. Bodine, Jr., Los Angeles, Calif.
(7877 Woodley Ave., Van Nuys, Calif.)
Filed Apr. 23, 1963, Ser. No. 275,157
6 Claims. (Cl. 264—23)

This application is a continuation-in-part of my prior application, Ser. No. 756,382, filed Aug. 21, 1958, entitled Sonic Method and Apparatus for Extruding Flowable Materials.

This invention relates generally to methods and apparatus for extruding or drawing flowable or plastic materials, and deals more particularly with the application of sonic wave action in such extrusion and drawing methods and apparatus. Drawing and extrusion are generally classified separately. The present invention, however, is generically applicable to both.

The materials in contemplation include those in solid, semi-solid, or consolidated granular state, including plastic or semi-plastic material such as rubber, plastics, metals and melts, and including also certain types of granular materials, such as sand, consolidated under earth pressure, or earthen materials generally, which while under static pressure can be caused to flow and extrude. Since all such flowing, forming, extruding, drawing, and other shaping, hot or cold, are generally recognized as a plastic forming phenomenon involving plastic physical properties, the term "plastic material" wherever used in the discussion or claims hereof is for the purpose of being generic to such material properties. The invention does not contemplate free or loose granular material, such as is often caused to flow down an open chute under influence of vibration.

The general object and nature of the invention may be stated preliminarily to be to facilitate extrusion or drawing of such materials as referred to above by application of sound waves either to the materials, or to the die member or members, or both; so as to transmit said waves to the boundary interface.

I have discovered that solid or semi-solid, plastic deformable or flowable consolidated materials can be made to extrude, i.e., pass through an orifice or tube, or to be drawn, with enhanced facility if sound waves are transmitted to the point of start of flow and to the region therearound. In the extrusion of many plastic or flowable materials, certain complex physical phenomena are encountered, of the nature of static friction or cohesion tending to resist plastic deformation or flow. Moreover, the defining surfaces of the die also appear to contribute a degree of static friction to the extruded material moving thereover. This is sometimes called "stick-slip" friction. Finally, particularly in the case of metal drawing, transmission of sound waves to the interior region of the part, where the molecules are in tension and are being drawn past or relative to one another, increases the ease of the drawing process. The metal "draws" under less tension, and a better structure is produced.

Sound waves applied to an extrusion or drawing nozzle die or orifice, or to a mandrel or punch therewithin, and/or to the materials to be extruded or drawn therethrough, tend to increase the fluidity or plasticity of the material. Apparently, with many materials, the sound waves produce a dynamic fluidity, due to the sonic vibration of the material, and to vibratory shear stresses set up therein. The plasticity of metals under tension is likewise improved.

A conventional extrusion apparatus consists generally of a chamber for containing material to be extruded, a pressure source which applies a high static pressure to the material in said chamber, and a die with an orifice therein leading from the chamber and through which the material is extruded, such orifice being usually shaped to accomplish a particular cross-section configuration. An inner die member or mandrel may be used inside the die orifice when tubular shapes are to be extruded. In the case of a metal drawing operation, it is conventional to use a die with an orifice or recess therein, and to provide a punch which can be moved with great force into the orifice or recess, with a metal blank to be drawn located in or over the orifice or recess, in the path of the punch. The present invention, broadly stated, comprises the application of intense sound waves to the pressurized material in the region of the die orifice or recess, including the material in the region of the entrance thereto, and/or to outer and/or inner die members, and particularly to the interface between the die, punch, mandrel, or die orifice or recess defining surfaces and the material, the result being great facilitation of the drawing or extrusion process, as the case may be. The material flows with lower pressure, or at lower temperature, and in the case of drawing, with lesser tension. It flows uniformly throughout its cross section, rather than being retarded adjacent the die surfaces; and much more intricate shapes can be formed, even those having an unusually large ratio of surface area to cross section area, such as radially-extended thin fins, etc. In complex extrusion or forming processes, where odd-shaped or thin cross sections are involved, the material sliding along the surfaces of the die members is retarded owing to friction on those surfaces, so that the central portion or core of the extruded material tends to roll over the outer region or shell. As mentioned hereinabove, this condition is greatly reduced by transmitting sound waves into the region which includes the area of surface contact between the material and the guiding die surfaces.

The invention will be further described in connection with the accompanying drawings showing various present illustrative embodiments thereof, and wherein:

FIG. 1 is a longitudinal sectional view through an extrusion apparatus in accordance with the invention;
FIG. 2 is a section taken on line 2—2 of FIG. 1;
FIG. 3 is a section taken on line 3—3 of FIG. 2;
FIG. 4 is a fragmentary view showing a modification;
FIG. 5 is a side elevation, partly in section, of a sonic machine for drawing metal in accordance with the invention, the parts being shown at the end of a forming operation;
FIG. 6 is a fragmentary view of a portion of the machine of FIG. 5, but showing the parts in a different (initial) position;
FIG. 7 is a plan view of the metal blank in position on the die and before engagement by the punch;
FIG. 8 is a fragmentary sectional view of the die and metal blank, the punch being in an intermediate position, with the blank partially formed; and
FIG. 9 shows a modification of the apparatus of FIG. 5.

The invention will be disclosed first in a simple illustrative application to the extrusion of thermoplastic materials, reference being had to FIGS. 1–3 showing simple illustrative extrusion apparatus equipped with means for applying sonic wave action both to the material being extruded and to the extrusion die members. A generally cylindrical material chamber 12 has an inlet 13 supplied with pressurized heated plastic material m in a flowable state from a suitable pressure source or pump, not shown, via a conduit 14, and has fastened to one end thereof a vibratory die plate or disc 15 formed with a central orifice 16 through which the material is to be extruded. Chamber 12 is here shown formed with a heat jacket 17 for the purpose of maintaining the material within the chamber 12 in a proper state of plasticity for good extrusion. The end of cylindrical chamber 12 opposite the die plate 15 has an end wall 18 formed, in axial alignment with extrusion orifice 16, with an aperture 19 to receive an elastic bar or mandrel 20, typically of circular cross-section. Mandrel 20, in the present instance, includes a reduced extremity 21 projecting with annular clearance through the die orifice 16, the extremity 21, which serves as an inner die member, being connected to the main portion of the mandrel on a streamlined contour as clearly shown in FIG. 1. Mandrel 20 projects through wall 18 by way of a sleeve 22 extending outwardly from wall 18 on a diameter somewhat larger than that of aperture 19, as shown. The annular shoulder 23 formed by this construction is engaged by one side of an annular flange 24 formed about the mid-portion of mandrel 20, and the other side of this flange is engaged by a resilient washer 25, which is in turn backed up by a nut 26 screwed into sleeve 22.

The extremity of mandrel portion 20a, outward of flange 24, has a mounting flange 30, to which is secured a vibration generator generally designated by the numeral 31. The generator 31 may be any one of various types, and may be designed to produce any one of various modes of vibration, such as longitudinally of the rod, transverse, or gyratory, as will be explained in more particular hereinafter.

The contours of the die orifice 16 in outer die 15 and of mandrel portion or inner die 21 are subject to variation in accordance with the desired cross-section of the extrusion to be produced. In the present illustration, it is assumed that simple cylindrical tubing is to be extruded, in which case the orifice 16 is circular in cross-section, as is the mandrel portion 21. It will be understood, of course, that these shapes may be varied as desired, and that, because of the facilitation of the extrusion process by the application of sonic wave acion, cross-sectional shapes impossible to produce with previously known techniques, such for example as thin fins, are well within the capabilities of the present process and apparatus. The die orifice 16 and mandrel portion 21 are longitudinally contoured, in accordance with more or less conventional practice, to provide a streamlined, convergent entrance throat *t* leading into the constricted region where the final shaping is imparted to the material. Further, while I have here shown apparatus for extruding a tubular shape, it will be understood that in any case in which a solid shape is to be extruded, the mandrel 20 will be terminated short of the die orifice such as at plane *x–y*. In such case, the mandrel serves only as a sound wave radiating device, its function as an inner die member having been removed.

While various types of vibration generator might be employed, I prefer to employ an electrically driven mechanical type such as is disclosed and claimed in my application Ser. No. 121,385, filed Mar. 21, 1962, for Vibration Generator for Resonant Loads and Sonic Systems Embodying Same. A generator of this type will be somewhat diagrammatically shown and described herein, and for additional details, reference may be had to said copending application.

As here shown, the vibration generator 31 comprises a housing 35 engaging the mounting flange 30 on the end of elastic mandrel 20, and secured thereto by long machine screws 36. The housing 35 embodies a rectangular body 38 formed with a horizontal cylindrical bore 39, and end plates 40 and 41 secured to opposite sides of body 38 over the ends of bore 39. The bore 39 forms a raceway for a cylindrical orbital inertia rotor, of somewhat smaller diameter, designated generally by numeral 45. The rotor 45 embodies a cylindrical inertia roller 46, of somewhat lesser diameter than that of raceway bore 39, as illustrated in FIGS. 2 and 3, for example, and which is rotatably mounted on an axle 47 projecting axially from the hub of a spur gear 48, which also comprises a part of rotor 46. The pitch circle of this spur gear 48 is of substantially the same diameter as that of the roller 46. Gear 48 meshes with an internal gear 49 located within housing body 38 concentrically with raceway bore 39, and whose pitch circle is of substantially the same diameter as that of said bore.

The rotor 46 is designed to move in an orbital path about its raceway bore 39 as a guide, bearing against the surface of said bore by centrifugal force. In this motion, gear 48 runs in mesh with internal gear 49. To maintain the roller in proper engagement with the raceway 39 while the generator is at rest, or coming up to speed, the axle 47 is provided with an axial pin 52 which rides around and is guided by a circular boss 53 projecting inwardly from end plate 40 coaxially with raceway bore 39.

The rotor 45 is driven through a universal joint coupling 55 connected between a conically gyratory drive shaft 56 and the hub of spur gear 48. The rotor 45, comprised of the assembly of roller 46 and gear 48, is laterally guided between the inside surfaces of end plates 40 and 41, having a close working fit therewith.

The opposite end of conically gyratory drive shaft 56 is coupled, through universal joint 57, with the drive shaft of an electric drive motor 58, and said motor is preferably of the type incorporating an adjustable means of conventional nature for regulating the speed of its drive shaft. The details of such speed regulation means need not, of course, be illustrated or described herein in view of their familiarity to those skilled in the art.

Drive motor 58 is mounted at the extremity of a bracket 59 here shown as mounted on and projecting from the extrusion apparatus.

Operation of the vibration generator is as follows: Rotation of shaft 56 produced by operation of motor 58 causes spur gear 48 to roll around internal gear 49, the shaft 56 moving in a conical gyratory fashion. The inertia roller 46 rolls on the bearing surface afforded by bore 39, so that the rotor 45 moves in an orbital path. The centrifugal force developed by the rotor moving in its orbital path is applied to the body member 38, and hence to the entire generator housing 31, the centrifugal force vector rotating about the axis of raceway 39. The roller 46 turns at nearly the same rate of rotation as the gear 48, with any slight variation or creep therebetween accommodated by the rotatable mounting of the roller on shaft 47. Thus a gyratory force is exerted on the body 38, and therefore on the housing 35 as a whole, and this gyratory force is exerted against the mounting flange 30 on the end of the elastic mandrel 20.

It will be seen that a component of oscillating force is thus delivered to the end of elastic mandrel 20 in a direction laterally of the latter, and that also a component of oscillatory force is exerted on the end of the mandrel 20 in a direction longitudinally of the mandrel.

The mandrel 20 is supported effectively near its mid-point through its mounting flange 24, and is arranged to undergo "free-free" standing wave elastic vibration, and this vibration may be either predominantly in the longitudinal mode, or predominantly in the transverse mode, depending upon whether the oscillating force delivered by the generator 31 is near a resonant frequency of the mandrel for longitudinal elastic vibration, or is near a resonant frequency of the mandrel for transverse elastic vibration. Generally speaking, particularly with inner and outer die members, as here shown, for purpose of extruding a tubular member, it is deemed preferable to choose primarily the longitudinal mode of vibration, and such will be assumed for the purpose of the present illustration, though of course without implied limitation thereto. In such case, motor 58 is regulated to accomplish a spin frequency of inertia rotor 45 which corresponds to a longitudinal resonant vibration frequency of the mandrel 20. Thus, the mandrel may be vibrated in a half-wavelength mode by proper choice of the spin frequency of the inertia rotor of the generator, such that the supported mid-point of the mandrel becomes the location of a node, and the two end portions thereof are the locations of anti-nodes of the standing wave. Under such circumstances, each half-portion of the mandrel alternately elastically elongates and contracts, the two half-portions of course undergoing this action in step with one another. The side surfaces of the mandrel 20 have a degree of shear coupling with the surrounding plastic material, and therefore subject the material to sound wave vibration. The slanting shoulder 20b between the central portion of the mandrel and the reduced extremity 21 has a longitudinal sonic drive coupling with the material within the throat region t and constricted die annulus s, and thus applies sonic wave action to the material flowing to and through the die annulus.

Moreover, not only is the plastic material subjected to sound wave action ahead of and within the die annulus but the inner die member 21 also vibrates (in a longitudinal direction) with respect to the plastic material being extruded over its outer surface. This sound wave action increases the fluidity of the material. A dynamic fluidity is produced, owing to the sonic vibration of the material, and to vibratory shear stresses set up therein. The sonic vibration so imparted to the material flowing through the die annulus, and also the longitudinal vibration mounting of the inner die member 21, reduce the friction between the extruding material and the inner die member, so that the material tends to flow uniformly, without retardation by reason of sliding friction with the member 21.

The invention further provides, as a preferred but optional feature, a means for imparting sonic elastic vibration to the outer die member or plate 15, and to this end, a second sonic vibration generator 70, which may be exactly like the sonic vibration generator 58, may be mounted on the outer die member 15. The sonic generator may be mounted near the center of the die, or as in this case, on its upper edge, as shown in FIG. 1. Also fragmentarily shown in FIG. 1 is the variable speed drive motor 71 for vibration generator 70, and a bracket means 72 mounted on the sonic extrusion apparatus and understood to provide support for the drive motor 71. The details of the generator 70, the drive motor 71, and the drive coupling therebetween, need not be separately shown, since they are identical to those of the generator 31. To indicate in the drawings the orientation of the rotor and raceway bore, however, the rotor for generator 70 is indicated in FIG. 1 at 73, and the raceway bore at 74.

By choice of spin frequencies for the orbital of gyratory rotor 73 of generator 70, various of the selective resonant modes of vibration may be imparted to the member 15. The frequency of the sonic generator may be chosen to generate a radial dilation mode in die 15. One preferred mode is a flexural plate type mode, characterized by an in-and-out elastic bowing of the die or plate 15. Vibration thus occurs transverse to the plane of the plate or disk. The outer or rim portion of the plate oscillates elastically at right angles to the plane of the disk, the inner portion of the disk likewise oscillates elastically in a direction at right angles to the plane of the disk, but in opposite phase, and an annular nodal region of minimized oscillation occurs between the rim and inner portions of the disk. This vibration pattern is represented by the standing wave diagram st in FIG. 1, where there are nodal regions at N, and antinodes V at the rim of the disk and in the center portion thereof. The plate 15 is proportioned to place the nodal region N in approximate alignment with the wall 12, so that the member 10 is supported at a region of small or zero vibration. The indicated mode of vibration occurs at a certain pre-determined resonance vibration frequency, which can be attained by regulation of speed of the drive motor 71 for the sonic vibration generator.

It will be seen that in this mode of operation, the die surfaces defining the orifice 16 vibrate sonically relative to the flow of the extrusion, so that retardation of flow along such surfaces is reduced. In result, the material being extruded moves uniformly throughout its cross-section without retardation and consequent rolling action over the surfaces of the die members.

As mentioned earlier, the material being extruded flows with lower pressure, and/or at lower temperatures, flows uniformly throughout its cross-section, and with such facility that more complex cross-sectional configurations can be employed than were possible heretofore, including thin longitudinal fins and other complex shapes of large surface.

FIG. 4 shows a modification, wherein the vibration generator 80, of the same type as that shown and described in FIGS. 1–3, is so mounted on the end of the elastic mandrel 20 that the orbit of the rotor, indicated at 81 in cylindrical raceway bore 82, is in a plane transverse to the mandrel. In other words, the longitudinal axis of the raceway bore 82 is either co-incident with or at least parallel to the longitudinal axis of the mandrel 20. In this case, the centrifugal force exerted by the rotor 81 acts to gyrate the end portion of the mandrel 20. In effect, the end portion of the mandrel is subjected to a rotating force vector which extends radially through the longitudinal axis of the mandrel. The effect is to cause the mandrel to be progressively elastically bent in a circular path, each point on the end portion of the mandrel describing a small circle. This elastic bending action is propagated as a wave transmitted along the length of the mandrel, reflected back from the far end thereof, re-reflected at the beginning end, etc. A resonant frequency exists for this mode of vibration in the bar, and when the drive motor 83, coupled to the vibration generator by the conically gyratory shaft 84, is regulated to impart to the rotor 81 a spin frequency which corresponds with the resonant frequency for a gyratory type standing wave in the mandrel, such wave action is set up in the mandrel. As with the longitudinal mode previously described, a nodal point exists at the mid-point of the elastically vibrating mandrel, and gyratory antinodes at the two ends thereof. Accordingly, with this mode of vibration, the reduced mandrel portion 21 gyrates in a plane transverse to the longitudinal axis of the extrusion, applying corresponding sonic wave action thereto, resulting in enhanced fluidity, or flowability, through the die.

Reference is next directed to FIGS. 5 to 8, inclusive, disclosing an application of the invention to drawing or reforming of a ductile metal part from a preform. The drawing apparatus, to be described in detail presently, has many features in common with the extrusion apparatus of FIGS. 1 to 3, as will appear presently. For illustrative purposes, there has been shown, as a typical part or preform to be drawn, a flat metal disk 90 (FIG. 6) having a center hole 91 extending therethrough. This disk is to be drawn from the initial shape shown in FIG. 6 through the intermediate shape represented at 90a in FIG. 8 to the final shell ring form 90b illustrated in FIG. 5.

The apparatus of FIGS. 5 to 8 includes a fragmentarily illustrated base 94 having a horizontal top 95, a head 96 supported vertically above top 95 by means of four rods 97, and a cross head 98 slidable on rods 97. The lower end portions of the rods 97 pass through ears 98 formed on base 94 and are fixed tightly to the latter by means of nuts 99 and 100. The upper extremities of the rods 97 pass through bores 101 in head 96 and are fixed to the latter by means of nuts 102 and 103. Coil compression springs 105 encircle rods 97 between nuts 99 and the cross head 98, and act, when depressed, as to the position of the cross head shown in FIG. 5, to return the cross head, as well as the later described punch, to the beginning or elevated position shown in FIG. 6.

Cross head 98 has formed therein vertical cylinders or cylinder bores 110, in which are slidably received pistons 111, the latter being on reduced piston rods 112 having at their upper ends flanges 113 which engage and are secured to the underside of head 96. Piston rods 112 are suitably packed at the top of cross heead 98, as indicated at 115.

Pistons 111 and rods 112 are longitudinally drilled to provide hydraulic fluid passages 117, which communicate with cylinders 110 and with hydraulic fluid passages 118 in head 96. Passages 118 are interconnected as at 118a, and are fed with hydraulic fluid under pressure through a suitable hydraulic supply line 119 leading from any suitable control valve and source of pressurized hydraulic fluid, not shown. It will be clear that introduction of hydraulic fluid under pressure via line 119, and the described fluid passages leading to cylinders 110 in cross head 98 depresses the latter against coil compression springs 105, moving the cross head and later described punch from the elevated position of FIG. 6 to the final position of FIG. 5.

Cross head 98 carries a vertical punch 120. This punch 120, which is composed of an elastic material such as alloy steel with good elastic fatigue properties, is very much the same as the mandrel 20 of the embodiment of FIG. 1, and can be substantially identical to the latter excepting for modification at its lower extremity to adapt it to the particular drawing operation in hand.

Thus, in the present instance, the punch or mandrel 120 is shown to have a lower reduced active punch element or extremity 121 having a rounded lower end or nose 122, and a concave flaring surface at 123, merging smoothly with a convex surface 124, which in turn merges smoothly with the cylindrical contour of the large diameter portion of the punch or mandrel. The punch or mandrel 20 extends through a relatively close fitting vertical bore 126 formed in cross head 98, and has near its mid-point an annular flange 127 which seats downwardly on the annular upwardly facing shoulder afforded by a counterbore 128 formed in the cross head. Lodged inside counterbore 128, immediately above flange 127, is a rubber O-ring 129, and the latter is held in position by means of a gland 130 screwthreaded into the top of the counterbore 128.

The upper portion 120a of mandrel 120 passes through an aperture 132 in head 96 and mounts on its upper extremity a vibration generator 134, which may typically be exactly like the vibration generator 31 of FIG. 1, being driven by an electric drive motor 135 corresponding with the drive motor 58 for the generator 31, said motor 135 being mounted on a bracket 136 which is itself mounted on cross head 98, and projects through the aperture 132 in head 96. It will of course be understood that the vibration generator 134 is driven from electric drive motor 135 by means of a conically gyratory shaft, not shown, but which will be understood to be like the shaft 56 of FIG. 2. The gyratory inertia rotor of generator 134 is designated generally by the numeral 138.

A die or die plate or wall 140 is mounted on the top 95 of base 94, and, as shown, one side thereof is laterally extended as at 140a, and supports a vibration generator 142, corresponding with the generator 70 of FIG. 1. The generator 142 may be of any type capable of suitably vibrating the die 140, but is here indicated as being of the same type as the generators 70 and 31 of FIG. 1. Thus, the generator 142 may be driven by an electric drive motor 143 fragmentarily shown in FIG. 5, and understood to be coupled with generator 142 by a gyratory shaft similar to the shaft 56 of FIG. 2, and to be mounted on a suitable bracket 144 affixed to base 94. The die 140, i.e., the outer die, has a die orifice, opening, or recess 148, aligned with and adapted to receive the inner die or punch member 121 of mandrel 120, and this die recess, in the present example, is radiused as at 149, in general correspondence with the curved portion 123 of the punch. The die is secured to base 94 as by light, elastic bolts 150, so that it is free to vibrate elastically through a very small amplitude relative to the base under the influence of the vibratory output of vibration generator 142. Preferably, the vibration frequency of generator 142 is adjusted relative to the size and geometry of die 140 to set up a standing wave pattern therein, such as in a flexural mode such as discussed in connection with the die 15 of FIGS. 1-3. Thereby sonic vibrations of small amplitude but relatively high frequency, with a principle component parallel to the die punch, are set up in the die 140, and particularly at the surface defining the die recess 148, so that such vibration will be transmitted to the metal blank 90 as the latter is forced into recess 149.

Operation of the drawing process and apparatus illustrated in FIGS. 5 to 8 is as follows: The die punch 120 being in the beginning position of FIG. 6, the blank 90, in the form of a perforated disk, is placed on die 140 over die recess 148, with its aperture 91 aligned with the punch. The blank 90 may be preliminarily positioned by any suitable means, such as by positioning pins 155 set into die 140. Vibration generator 138 is then driven, so as to set up a longitudinal standing wave in the mandrel 120, thereby causing sonic frequency vibration, in a longitudinal direction, of the punch element 121; or, vibration generator 143 is operated, so as to set up vibration in the die 140, and along the surface of the die orifice or recess 149. Preferably, however, both vibration generators are operated simultaneously.

The generator 134 is operated to set up in the mandrel 120 elastic standing wave vibrations of the same general character described in connection with FIG. 1. As pointed out in the discussion of the operation of the apparatus of FIG. 1, either a lateral or a longitudinal mode of standing wave action can be set up in the mandrel, and this is also true of the process and apparatus of FIGS. 5 to 8, though again, as in the earlier instance, the longitudinal standing wave action is generally preferably, and will be chiefly considered, though without implied limitation thereto. A longitudinal standing wave being thus set up in the mandrel 20, it will be understood that the punch element or extremity 121 is set into sonic elastic vibration along the longitudinal direction line of the mandrel 120.

While the punch element 121 and/or die 140 are thus in a state of vibration, the machine being in the position of FIG. 6, the hydraulic fluid under pressure is admitted through line 119 and the previously described fluid passages into the cylinders 110, causing the cross head 98 and vibrating mandrel 120 to descend against springs 105 through the position of FIG. 8 to the final position of FIG. 5. Such downward movement may be terminated by any suitable stop means, not shown, after which, through manipulation of suitable control means, the fluid introduced into cylinders 110 is withdrawn, and the cross head 98 and punch are raised back to the beginning position of FIG. 6.

In the illustrative case here given, the aperture 91 in disk 90 may be assumed to have initially a slightly smaller diameter than the diameter of the reduced end portion of the punch. Accordingly, the rounded nose of the punch passes partially inside the aperture 91, and then bends and draws the inner portion of the blank 90 downwardly, the punch forcing its way into the aperture 91, and thus coming into tight engagement with the blank. The punch and blank thus move to and through the intermediate position illustrated in FIG. 8, where the punch portion 121 is entirely inside the aperture in the apertured disk or ring, and the ring is bent and drawn downwardly, generally as indicated. The ring is here tightly "impaled" on the punch. In the position of FIG. 8, the ring has already been stretched downwardly somewhat, and corresponding tension has been set up therein. Also, in and near the position of FIG. 8, the partially formed ring is already feeling the favorable influences of the vibratory action of the punch and the die 140. The vibrations in the latter are transmitted into the ring, and facilitate the sliding of the molecules of the material of the ring relative to one another as the ring is formed into its new shape. The tensile "drawing" of the metal of the ring is particularly aided. At the same time, the punch is exerting a vibratory action on and in the ring then impaled thereon, and greatly increases the vibratory action in the ring in the axial direction, i.e., in the direction of the drawing action, and thus aids said action by improving the ability of the molecules of the ring to slide past or relative to one another under the applied tensile stress.

As the punch and ring move on down and to the final position of FIG. 5, the ring moves obviously into greater and greater surface engagement with the defining surfaces of both the punch and the die recess or orifice, and the vibratory action transmitted into the ring is correspondingly increased, and, of course, the benefits of the vibration more fully realized. It will be appreciated that a deep tensile drawing takes place between the positions of FIG. 8 and 1, and the necessary plastic flow of the material of the ring is nicely aided by the sonic vibration at this time.

FIG. 9 shows a modification of the apparatus of FIGS. 5–8, designed for the making of a cup or hat-shaped part from a flat disk ductile metal blank by a deep drawing operation using a yieldable rubber or neoprene die. The punch is indicated generally at 160, on the end of fragmentarily illustrated mandrel 161, which will be understood to be similar to mandrel 120 of FIG. 5 and to be similarly operated and vibrated.

Punch 160 has a generally frusto-conical working end or head 164. This punch head 164 is adapted to work into, or, by displacement, form a die recess within, a soft rubber or neoprene die block 165 mounted within die plate 166. The die block 165 may be disk-like in general form, with a central aperture therethrough, the boundary of which, prior to engagement of the die head thereon, being indicated by the dashed lines 166. The hat-shaped part produced in the apparatus is designated generally by the numeral 168. It will be understood that this part was formed from a flat disk blank, positioned initially by pins 169. As the sonically vibratory die head 164 is progressively lowered against such disk, the blank is progressively bent and drawn to the shape illustrated, forming a cup-like part 170 conforming to die head 164, and a surrounding flange 171 resting partly on die plate 166 and partly on rubber die block 165. The rubber block 165 recedes to accommodate the punch and the part 168 as the latter is formed, the thus indented surface of the die block 165 serving as the defining surface of the progressively enlarged die opening or recess. The sonic vibration of the die punch head 164, in close, acoustically coupled relation with the part being formed, is transmitted into the part, which is being subjected to tensile stress and to a deep drawing as a consequence thereof. This sonic vibration in the part being drawn greatly eases and facilitates the slipping of the molecules past one another, i.e., reduces internal friction, and thereby facilitates and improves the drawing operation.

The drawings and description will be understood to be of present preferred illustrative embodiments of the invention, and it will be understood that many variations thereof are within the scope of the invention as defined by the broader of the appended claims.

I claim:
1. The process of forming plastic material by forming it between a die and a mandrel comprising:
   vibrating at least one of said die and said mandrel at a resonant frequency thereof during the forming process.
2. The method of extruding a plastic material through an orifice in a die that comprises:
   setting up vibration of said die at a resonant frequency thereof during the extrusion process.
3. The process of reforming a pre-form between a die and a punch comprising:
   vibrating at least one of said die and said punch at a resonant frequency thereof during the reforming process.
4. An apparatus for extruding plastic material comprising:
   a chamber for holding a pressurized material to be extruded, said chamber having an extrusion die connected thereto; and
   mechanical oscillator means connected for vibrating the die at a resonant frequency thereof during said forming.
5. An apparatus for forming plastic material by forming it between a die and a mandrel comprising:
   a die member and a mandrel mounted with said material between said die member and said mandrel; and
   mechanical oscillator means connected for vibrating at least one of said die and said mandrel at a resonant frequency thereof during said forming.
6. An apparatus for reforming a pre-form between a die and a punch comprising:
   a die and a punch mounted for relative movement therebetween with said pre-form between said die and said punch; and
   mechanical oscillator means connected for vibrating at least one of said die and said punch at a resonant frequency thereof during said reforming.

References Cited by the Examiner
UNITED STATES PATENTS

| | | | |
|---|---|---|---|
| 2,408,627 | 10/1946 | Green | 264—70 |
| 2,549,179 | 4/1951 | Deboutteville | 264 |
| 2,717,474 | 9/1955 | Smith | 264 |
| 3,002,614 | 10/1961 | Jones | 264—70 |

ROBERT F. WHITE, *Primary Examiner.*

ALEXANDER H. BRODMERKEL, *Examiner.*